INVENTOR.
JOHN P. BELTZ
BY John V. Regan
Attorney

INVENTOR
JOHN P. BELTZ
BY John V. Regan
ATTORNEY

Jan. 24, 1967 J. P. BELTZ 3,300,757
CHARACTER READER UTILIZING ON-THE-FLY
IDENTIFICATION OF CHARACTER
FEATURE SIGNALS
Filed May 11, 1964 3 Sheets-Sheet 3

RECOGNITION
TRUTH TABLE

| | URS | LRS | UCS | LCS | ULS | LLS | SWG | LVM |
|---|---|---|---|---|---|---|---|---|
| 0 | + | + | − | − | + | + | − | − |
| 1 | | | + | + | − | − | | − |
| 1 | + | + | − | − | − | − | − | − |
| 2 | + | − | − | − | − | + | | − |
| 3 | + | + | − | − | − | − | + | − |
| 4 | | | + | + | + | − | | − |
| 4 | + | + | + | − | − | − | | − |
| 5 | − | + | − | − | + | − | | − |
| 6 | − | + | − | − | + | + | | − |
| 7 | + | − | − | + | − | − | | − |
| 8 | + | + | − | − | + | + | + | − |
| 9 | + | + | − | − | + | − | | − |
| * | + | − | | − | | − | | − |
| M | | | | | | | | + |

Fig. 4.

INVENTOR.
JOHN P. BELTZ
BY John V. Regan
Attorney

United States Patent Office 3,300,757
Patented Jan. 24, 1967

3,300,757
CHARACTER READER UTILIZING ON-THE-FLY IDENTIFICATION OF CHARACTER FEATURE SIGNALS

John P. Beltz, Willingboro, N.J., assignor to Radio Corporation of America, a corporation of Delaware Filed May 11, 1964, Ser. No. 366,273
8 Claims. (Cl. 340—146.3)

This invention relates to character readers, and more particularly to character recognition methods and circuits for use in such readers.

Certain character readers operate to scan characters printed on a document and recognize the characters by the distinctive sets of video signals produced when different characters are scanned. The character reader then translates the recognized characters into a digitalized code representing the characters for storing in a storage medium or for processing by a computer.

The characters to be read from a document may, for example, be printed by a computer-operated high speed printer of the drum type or the like. In a drum printer complete characters are formed on type bars and the bars are selectively energized to strike an inked ribbon so as to produce inked impressions of the characters on a document being printed. Such high speed printers frequently print a distorted version of the character. For example, either the top or the bottom portions or horizontal strokes of the character may not be printed at all due to the speed of the drum. Such distorted characters are difficult to recognize.

Accordingly, it is an object of this invention to provide an improved character reader capable of recognizing distorted characters.

It is another object of this invention to provide an inexpensive character reader capable of recognizing distorted characters.

The recognition of characters in a character reader, in accordance with the invention, is predicated on detecting the reliable features contained in the outline trace of the distorted characters. The major reliable features in the distorted characters are the vertical strokes in the characters. Such features are rarely omitted when the characters are being printed. Additionally, a stylized font, such as a match stick font, may be utilized in the printing of the characters to emphasize such vertical strokes in the character. Another feature which may be employed also aids in recognizing the distorted characters is the white gap that occurs between horizontal strokes in some characters. Even though horizontal strokes are omitted when characters are printed by a high speed printer, it is rare that both the top and bottom horizontal strokes will both be omitted from the same character. Thus, there are nearly always two horizontal strokes between which a white gap is detectable.

A recognition system embodying the invention recognizes the fact that characters are differentiated from each other by the locations or zones in each character in which the major features of the character occur. Thus, the position of a feature is detected along with the feature itself for accurate recognition.

Therefore, it is a further object of this invention to provide a character reader which detects reliable features in a character and accurately positions the features relative to each other.

It is another object of this invention to provide a character reader which classifies features into prescribed categories based on the detection of the features in the character.

It is still a further object of this invention to provide a character reader which reclassifies features when they are classified incorrectly.

In accordance with the invention, a character reader reads characters from a document by scanning the characters to derive feature signals representing the features of the characters. A predetermined feature when detected in a character is classified into a prescribed category indicating the position of the feature in the character. The predetermined feature is reclassified into a different category indicating a different position in the character upon the detection of another predetermined feature in the character.

In the drawings:

FIGURE 1 is a schematic block diagram of a character reading system embodying the invention;

FIGURES 2*a*, 2*b* and 2*c* are diagrammatic illustrations of the scanning of an individual character in the character reader of FIGURE 1 and the zones into which characters may be divided;

FIGURE 3 is a schematic block diagram of a character recognition system embodying the invention; and FIGURE 4 is a Truth Table utilized in recognizing characters by the recognition system of FIGURE 3.

*General*

Referring now to FIGURE 1, a schematic block diagram of a character reading system 10 is illustrated. The system includes a transport mechanism or document handling device 12 for transporting a document 14 having characters 16 printed thereon. The transport mechanism 12 moves the document 14 at a substantially constant velocity in the direction of the arrow shown thereon past the front of a scanner 18. The scanner 18 may, for example, comprise an electronic scanning system such as a vidicon camera tube system or alternatively may comprise a mechanical rotating disc scanning system of the Nipkow type. The characters 16 are normally printed in a horizontal line on the document 14 and the characters are scanned by a plurality of vertical scanlines in a raster type scanning. The scanner 18 may provide one dimension of the raster, i.e., the vertical, whereas the movement of the document 14 by the transport mechanism 12 provides the other dimension, i.e., the horizontal. The scanner 18 generates video signals which serially represent the features of the characters 16.

The video signals are applied to a video processing and quantizing circuit 19 which processes the video signals to provide uniform amplitude pulses having fast rise and fall times. The quantized video signals are applied to a character recognition system 20, wherein the video signals are recognized as particular characters and encoded into a digitalized form, such as a binary coded form.

The document transport 12 also includes a document presence generator (not shown) which generates a document presence signal level when the transport mechanism 12 positions a document 14 in the scanning area. The scanner 18 also generates a start scan pulse at the beginning of each scan. Both the document presence signal level and the start scan pulse are applied to the character recognition circuits 20 to initiate the detection and recognition processes. The coded output signals from the character recognition circuits 20 are applied to an output circuit 22 which may, for example, comprise a storage medium for storing the signals or a computer for further processing the signal.

*Character scanning*

In FIGURE 2*a* is shown the manner in which an individual character, the numeral 5, is scanned by the scanner 18. A character is scanned from top to bottom while the character is simultaneously moved from left to right by the transport mechanism 12. Thus, each character is scanned both substantially orthogonally and successively by a plurality of substantially vertical scanlines 30 commencing at the right and ending at the left of the character. In FIGURE 2, six scanlines numbered 1 to 6 are shown as scanning the character. Other scanning patterns, of course, may be utilized if desired. The scanning may commence at the left and end at the right of a character, of course. However, in reading numeric characters, the least significant digit is scanned first by the scanner 18 which permits ease of adding numeric characters in an output computer. Each scanline 30 commences near a line 32 toward the top of the document 14 and ends near a terminal line 34 underneath the character and toward the bottom of the document. As will be described more fully later in the specification, each scanline 30 is divided into intervals which are synchronized in time by a plurality of timing pulses generated in the character recognition circuit 20. The timing pulses are indicated as the spaces between the horizontal dashes formed vertically in FIGURE 2*a*. Each character is normally formed such that a scanline takes fourteen timing pulse TP intervals to traverse the character from top to bottom. Such a timing pulse interval will be referred to as an element. For purposes of explanation throughout the specification, elements will be utilized to measure time as well as distance.

*Feature zoning*

It is apparent that the features to be detected in a character, such as the vertical strokes, occur only in particular portions or zones of different characters. For example, the numeral 2 includes an upper-right stroke (URS) and a lower-left stroke (LLS). The numeral 5 includes a lower-right stroke (LRS) and an upper-left stroke (ULS). The numeral 7 includes a lower-center stroke (LCS), whereas the numeral 1 includes both an upper and lower-center stroke (UCS and LCS). Both the 5 and the 2 also include center horizontal strokes (CHS). Thus, the features of a character are classified as occurring in upper and lower vertical zones UZ and LZ, respectively, as well as right, center and left horizontal zones RZ, CZ and LZ, respectively.

The right, center and left horizontal zones each comprises two of the six scans of a character and are thus determined by a fixed reference, i.e., a count of scanlines. Therefore, the exact horizontal positioning of the features detected when scanning a character is readily obtained.

It is difficult to determine from which vertical zone a feature, such as a vertical stroke, is detected because some characters in a line of print may be misaligned, the document itself may be skewed, etc. Therefore, if an easily obtainable fixed reference point is utilized to determine the vertical zones, such as the start of a scan, then incorrect readings occur when the misaligned and skewed characters are read. Alternatively, if the top or bottom of the character itself is utilized as the reference point, then incorrect readings occur when distorted characters, with portions missing, are read. Furthermore, the detection of such a top or bottom character reference point requires such complex circuitry that the character reader becomes too expensive for reading even undistorted characters.

The character reader 20 utilizes the first major feature detected in a character to establish a reference point from which the succeeding features in the character are referenced in order to determine in which vertical zones the detected features belong. The character reader 20 classifies the first major feature detected, i.e., a vertical stroke, as occuring in the upper zone of the character. If a succeeding vertical stroke in the character is detected in sections of the scans above the positioning of the first vertical stroke, then the first vertical stroke is reclassified into a lower zone category. Alternatively, if the succeeding vertical strokes in the character are detected in sections of the scans below or on the same level as the position of the first vertical stroke, then the first vertical stroke is not reclassified.

The positioning of the succeeding vertical strokes is determined by dividing each scanline into an equal number of sections commencing when the first vertical stroke is detected in a character and then ascertaining in which section the succeeding vertical strokes occur. This may be seen by referring to FIGURES 2*b* and 2*c*. In FIGURE 2*b*, the scan A detects the first vertical stroke in the character 5 and initiates a scanline sectionalizer. The sectionalizer effectively divides the remaining portion of the scanline A and all succeeding scanlines into sections. The part of the scanline A in which the first vertical stroke is detected is designated section 1. The remaining part of the scanline A occurring after section 1 (S1) is designated section 2 (S2). The next succeeding scanline begins at a section where the scanline A left off. In this instance, the next succeeding scanline begins at the beginning of section 3 (S3), and continues up to the section 6 (S6) after which section 1 (S1) begins again. The stroke in scanline A is classified as an upper-right stroke since it is the first stroke detected. In the succeeding scans, the detected vertical strokes are referenced to the first stroke detected by noting the scanning sections in which they are detected. Thus, in scanline B, a vertical stroke is detected in the scanning section 6 (S6) which is the section immediately preceding the scanning section 1 (S1). Since this section occurs before section 1, the first vertical stroke must be incorrectly classified. Thus, the first vertical stroke is reclassified as a lower-right stroke.

In FIGURE 2*c*, the first vertical stroke in the numeral 2 is detected in the scanline A and initiates the scanning sectionalizer to start dividing the scanline into sections commencing with section 1 (S1) and ending with section 3 (S3). The detected stroke is classified as an upper-right stroke. Succeeding scanlines are divided into six sections S1 through S6. Another vertical stroke is detected in section 2 (S2) of the scanline B. Since this vertical stroke is detected in a section immediately succeeding the scanning section 1 (S1), it is determined that the first vertical stroke has been correctly classified as an upper-right stroke.

The logic equations for detecting the six vertical strokes that can occur are:

$$URS=[(RHZ)\ (MVS)]\ [(6S)+(1S)\ (\overline{RC})]$$
$$LRS=[(RHZ)\ (MVS)]\ [(2S)+(1S)\ (RC)]$$
$$UCS=[(CHZ)\ (MVS)]\ [(6S)+(1S)\ (\overline{RC})]$$
$$LCS=[(CHZ)\ (MVS)]\ [(2S)+(1S)\ (RC)]$$
$$ULS=[(LHZ)\ (MVS)]\ [(6S)+(1S)\ (\overline{RC})]$$
$$LLS=[(LHZ)\ (MVS)]\ [(2S)+(1S)\ (RC)]$$
$$RC=(MVS)\ (6S)$$

The meaning of the above abbreviations and others are listed below.

*Abbreviations*

*URS*=upper-right stroke
*LRS*=lower-right stroke
*UCS*=upper-center stroke
*LCS*=lower-center stroke
*ULS*=upper-left stroke
*LLS*=lower-left stroke
*RHZ*=right horizontal zone $CHZ$=center horizontal zone
$LHZ$=left horizontal zone
$MVS$=medium vertical stroke
$SWG$=short white gap
1$SS$=first scanning section
2$SS$=second scanning section
6$SS$=sixth scanning section
$RC$=reclassify
$\overline{RC}$=not reclassify

*Detailed description*

Figure 1:
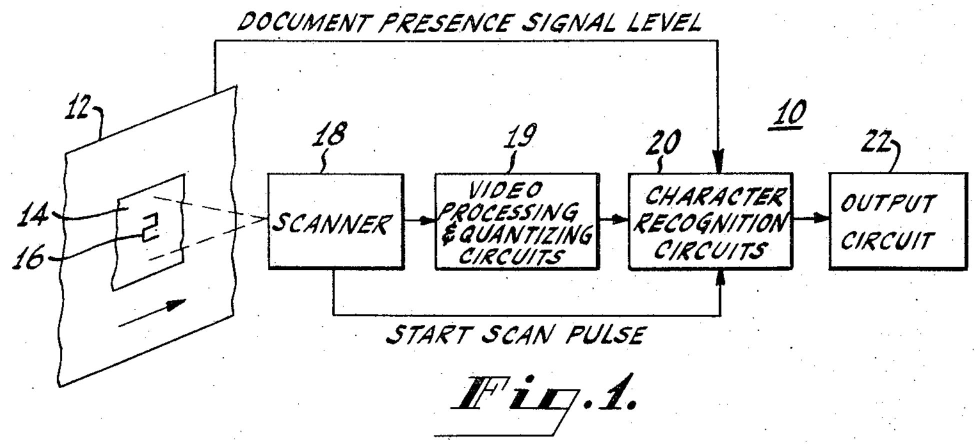

In FIGURE 3, one exemplification of a character reader embodying the invention is illustrated. The document presence signal from the transport mechanism 12 and the start scan pulse from the scanner 18 are applied to an input circuit 50. The input circuit 50 includes a flip-flop 52 which denotes that a document 14 is in the scanning area. The document presence signal is applied through an inverter 51 to the reset terminal R of the flip-flop 52 to reset this flip-flop when a document leaves the scanning area. The document presence signal is also applied as one input to an input AND gate 54. Another input to the gate 54 comprises the reset output signal from the "0" output terminal of the flip-flop 52. The third input to the AND gate 54 comprises a start scan pulse which is delayed in an adjustable delay line 56. The delay line 56, as will be described more fully subsequently, is adjusted to center the effective scanning raster on the characters 16 being read. The AND gate 54 is activated by the simultaneous applications of the input signals thereto to produce an output pulse which is coupled through a delay circuit 58 to set the flip-flop 52. The "1" output terminal of the flip-flop 52 produces, when set, a signal which is applied to activate a synchronizer 60.

The synchronizer 60 produces timing pulses which synchronize the scanning of a character with the flow of video signals into the character recognition system 20. The synchronizer includes a clock oscillator or pulse generator 62 which may, for example, produce pulses at a 31 kilocycle rate, or one pulse every 32 microseconds. The clock pulses are applied as one input to a three-input AND gate 64. Another input to the gate 64 comprises the signal derived from the flip-flop 52 while the third input comprises the inverted output of one count of a decimal counter 66. The periodic pulse output of the AND gate 64 is applied to the advance terminal A of the decimal counter 66 to advance the counter 66 from a count of 0 to a count of 39. The count of 39 terminal (CT39) of the counter 66 is coupled through an inverter 68 to the AND gate 64 to deactivate this gate when the 39th pulse in a cycle has been counted. The counter 66 is reset to a count of 0 by applying a delayed start scan pulse derived from the delay circuit 56 in the input circuit 50 to the reset terminal R of the counter 66.

The output of the count of 1 terminal (CT1) of the counter 66 is applied to set a flip-flop 68 which in turn is coupled to enable an output AND gate 70. The gate 70 produces the timing pulses TP in the recognition circuits 20. The clock pulses from the oscillator 62 are applied through an inverter 72 to the other input of the output AND gate 70 to activate the gate 70 to produce a timing pulse a half cycle after a clock pulse is generated in the oscillator 62. The count of 31 terminal (CT31) of the counter 66 is coupled to reset the flip-flop 68 at a count of 31 so that the synchronizer 60 produces only groups of 30 timing pulses for synchronization of the video information.

The count of 38 terminal (CT38) of the counter 66 is applied as one input to an AND gate 74. The AND gate 74 functions to produce an output pulse at the end of any scan in which no black elements in the video signals are detected. The other input to the gate 74 is derived from the "0" output terminal of a white scan detecting flip-flop 76, which is reset by a start scan pulse derived from the delay circuit 56. The flip-flop 76 is set by a black pulse derived from an input video shift register 80 (FIGURE 3). The output of the AND gate 74 is applied through an OR gate 78 to produce a general reset or clear pulse. The OR gate 78 is also coupled to receive an input from the AND gate 54 in the input circuit 50 to produce a clear pulse when the presence of a document is first detected by the AND gate 54. The general reset or clear pulse is applied to the various registers, flip-flops, etc., to reset them.

An input shift register 80 is included in the character recognition circuit 20 to synchronize the advance of video information signals into the circuit 20. The quantized video signals derived from the video quantizing circuit 19 are applied to the input terminal I of the shift register 80 and shifted into the register by applying advance pulses derived from the output AND gate 70 of the synchronizer 60 to the advance terminal A of the register 80. The register 80 is reset by applying a delayed start scan pulse derived from the delay circuit 56 to the reset terminal R thereof.

The shift register 80 may, for example, comprise eleven stages of flip-flop circuits. Each flip-flop circuit or stage of the register 80 exhibits an output of one level when a video signal containing a black element is stored therein. A video signal contains black elements when the outline trace of a character is intercepted by a scanline. An output of another level is produced by a flip-flop when a white element is stored therein. The video signal contains white elements when the outline trace of a character is not intercepted by a scanline. For convenience, a black element is denoted by the symbol B in FIGURE 3, and a white element is denoted by the symbol W. The B signals are taken from one output side of the flip-flops in the register 80, while the W signals are taken from the other output side thereof. The signals are applied through a bus 82 to other circuits in the recognition system. For convenience, the individual connections from the bus 82 to the other circuits are denoted 1B, 2B, etc., when derived from the "1" output sides of the corresponding flip-flop stages in the register 80 and denoted 4W, 5W, etc., when derived from the other output sides of the corresponding flip-flop stages.

The video signals synchronized or digitized in the shift register 80 are applied to a vertical stroke detector 90. A medium vertical stroke is defined as a feature which is five black elements high and which does not contain more than single and separated white elements therein. Thus, 2B and 4B signals from the register 80 are applied as inputs to an AND gate 92, the output of which is coupled to OR gate 94. The other input to the OR gate 94 is a 3B signal. The output of the OR gate as well as clock pulses derived from the clock generator 62 are applied along with 1B and 5B signals to an output AND gate 96. The AND gate 96 produces an output signal when a medium vertical stroke has been detected. The AND gate 96 is coupled to set a flip-flop 98. The flip-flop 98, which is reset at the end of every scan by the output from the count of 37 terminal (CT37) of the counter 66 in the synchronizer 60, has its "1" output terminal coupled to a one-shot multivibrator 100. The one-shot multivibrator 100 produces an output pulse denoting that a medium vertical stroke has been detected in a scanline during scanning a character. The pulse is coupled through an OR gate 102 to provide the output from the circuit.

Additionally, the vertical stroke detector 90 also includes circuitry to detect a long vertical stroke such as those that occur in the numerals 8 or 0 from a matchstick font. Thus, the 8B and 10B signals from the shift register 80 are applied to an AND gate 104. The output of the gate 104 is coupled through an OR gate 106 to provide one input to an AND gate 108. The other input to the OR gate 106 comprises a 9B signal from the shift register 80. Similarly, the other inputs to the AND gate 108 comprise clock pulses from the clock generator 62, as well as 7B and 11B signals from the initial shift register 80, and an output pulse from the AND gate 96 denoting that a medium vertical stroke is stored in the register 80. Thus, a long vertical stroke is effectively defined as two medium vertical strokes that occur in the same scanline. The output of the AND gate 108 provides the other input to the OR gate 102.

A short white gap detector 110 is included in the character recognition circuits 20 to detect middle horizontal strokes that occur in some characters such as the middle horizontal stroke in the 5, 2, etc. A short white gap is effectively defined as at least a pair of black elements which are separated by no more than five white elements, but more than two white elements, which occur in the center zone of a character. Thus, the detector 110 measures in effect the short white gaps between the top and middle horizontal strokes and the middle and bottom horizontal strokes in a single scan in the center zone of an undistorted character. The detector 110 also measures the short white gap in a distorted character having a top or bottom horizontal stroke missing by measuring the white gaps between the middle horizontal stroke and the remaining top or bottom horizontal stroke in two scans of the character.

The 1B and 2B signals from the initial shift register 80 are applied to an OR gate 112. The output of the OR gate is applied to a multi-input AND gate 114. The other inputs to the AND gate 114, which are derived from the shift register 80, comprise the 7B, 4W, 5W, 10W and 11W signals. The remaining inputs to the AND gate 114 comprise a center zone signal derived from a horizontal zone indicator 130, a signal applied from the reset terminal R of flip-flop 116, a count of two signal derived from a counter 118, and the clock pulses from the oscillator 62. The output terminal of the AND gate is coupled to set the flip-flop 116. The flip-flop is reset by a 7W signal from the register 80. The "1" output terminal of the flip-flop 116 is coupled to the advance terminal A of a counter 118 to advance the counter 118 by a count of 1. The counter 118 is reset to zero by a clear pulse applied to the reset terminal R thereof. The count of 2 terminal (CT2) of the counter 118 is coupled through an inverter 120 to provide one of the inputs for the AND gate 114. Thus, as will become more apparent subsequently, the counter 118 provides an output when a white gap has been detected twice and then inhibits the detection of any further horizontal strokes.

A horizontal zoning indicator 130 is provided in the character recognition circuit 20 to divide a character into horizontal zones as determined by a count of the scanlines as the character is being scanned. Thus, the horizontal zone in which a feature is detected is determined by the indicator 130. The indicator 130 includes an input AND gate 132. One of the inputs to the gate 132 is derived from the count of 37 terminal of the counter 66. The second input is a signal from the "1" output terminal of a flip-flop 152 which denotes that a character is present. The third input is an inverted left zone LZ signal denoting that the left side of a character has not been scanned. The input AND gate 132 is coupled to a three-stage binary counter 133 which includes three triggerable flip-flops 134, 136 and 138, all of which are reset by a clear pulse produced in the OR gate 78. The AND gate 132 is coupled to the trigger input terminal T of the flip-flop 134, whereas the "0" output terminal of the flip-flop 134 as well as the "0" output terminal of the flip-flop 136 are coupled to the trigger input terminals T of the flip-flops 136 and 138, respectively.

An AND gate 140 is activated by signals from the "0" output terminals of the flip-flops 136 and 138 to denote that the right zone RZ of a character is being scanned. An AND gate 142 is activated by signals from the "1" output terminal of the flip-flop 136 and the "0" output terminal of the flip-flop 138 to denote that the center zone CZ of a character is being scanned. Finally, an AND gate 144 is activated by signals from the "0" output terminal of the flip-flop 136 and the "1" output terminal of the flip-flop 138 to denote that the left zone LZ of a character is being scanned. The output of the left zone AND gate 144 is applied through an inverter 148 to inhibit the input AND gate 132 when the left zone of a character is being scanned. All of the flip-flops 134, 136 and 138 are reset by applying a clear pulse to their reset R terminals.

A scanning sectionalizer circuit 150 is included to divide each scanline into a plurality of equal sections after the first vertical stroke is detected in a character. The sectionalizer 150 includes a flip-flop 152 which is set by a medium vertical stroke signal pulse from the OR gate 102 in the vertical stroke detector 90. The flip-flop 152 is reset by a clear pulse. The flip-flop 152 produces an output from the "1" output terminal which is applied as one input to an AND gate 153. The other inputs to the AND gate 153 are the timing pulses TP developed in the synchronizer 60. The timing pulses, coupled through the gate 153 when a vertical stroke sets the flip-flop 152, are applied to the advance terminal A of a ring counter 154. The counter 154 includes five stages connected in a ring with the output of the fifth stage of the counter 154 being fed back to the input terminal I of the first stage as well as to the advance terminal A of a second ring counter 156. The second ring counter 156 includes six stages with the output of the sixth stage S6 being fed back to the input terminal I of the first stage S1. The counters 154 and 156 are reset by a clear pulse applied to their reset terminals R and then the ring counter 154 is advanced by a count of one for each timing pulse TP applied to the advance terminal A thereof. The ring counter 154 in turn advances the ring counter 156 by a count of one for each count of five in the counter 154. Thus, the counters 154 and 156 count the thirty timing pulses derived from the synchronizer 150 in six sections of five timing pulses each. The counters 154 and 156 are initially set to a count of 1 and 3, respectively, by the resetting of the flip-flop 152 by a clear pulse.

The character recognition circuits 20 also include a vertical zoning indicator 160 which classifies the vertical strokes detected into upper or lower zone categories. There is one vertical zoning indicator for each horizontal zone in a character and the vertical zoning indicator 160 is for the right zone RZ of a character. The interconnections for the vertical indicator 160 are shown in detail in FIGURE 3, but the zoning indicators 160A and 160B for the center and left zones, respectively, are shown in outline form only. The indicators 160A and 160B are given the same reference numerals as the indicator 160, but an A and a B is appended thereto, respectively, to differentiate these circuits. Thus, the circuit connections being identical to the indicator 160 will not be described in detail.

The right vertical zone indicator 160 includes a plurality of input AND gates 162, 163 and 164. One input to each of the AND gates 162–164 comprises a signal from the OR gate 102 denoting that a vertical stroke has been detected. The second input to each of the gates 162–164 denotes that the right zone of a character is being scanned. The third input to the gates 162–164 comprise, respectievly, the outputs of the sixth, first and second stages of the ring counter 156 which denote that these sections in a character are being scanned. The outputs of the gates 162–164 are coupled to the set terminals of the flip-flops 165, 166 and 167, respectively. The flip-flops 165–167 are all reset by a clear pulse. The "1" output terminals of the flip-flops 165 and 167 are coupled to one input terminal of the OR gates 168 and 169, respectively. The output of the OR gate 168 denotes that an upper-right stroke URS has been detected, whereas the output of the OR gate 169 denotes that a lower-right stroke LRS has been detected. The other inputs to the OR gates 168 and 169 comprise the outputs from a pair of AND gates 170 and 172, respectively. The "1" output terminal of the flip-flop 166 is coupled to provide one input to each of the AND gates 170 and 172. The other inputs to the gates 170 and 172 are derived from a reclassification circuit 180.

The reclassification circuit 180 is coupled to the vertical zoning indicators to reclassify strokes if they are indicated as occurring in the wrong zone. The reclassification circuit includes an OR gate 182 which has as its inputs, signals from the "1" output terminals of the flip-flops 165, 165A and 165B. The output of the OR gate 182 comprises the other input to the AND gates 172, 172B and 172C in the vertical zoning indicators 160, 160B and 160C, respectively. The output of the OR gate 182 comprises a reclassification RC signal. The reclassification signal is also inverted in an inverter 184 to derive a not reclassification $\overline{RC}$ signal. The $\overline{RC}$ signal is applied as the other input to the AND gates 170, 170B and 170C in the vertical zoning indicators 160, 160B and 160C, respectively.

All of the various feature signals detected in the character recognition circuits 20 are applied to a decoder 200. The decoder 200 may, for example, comprise a diode decoder matrix which produces a separate recognition signal for each of the characters recognized. The recognition signals are applied to a character encoder 210 which encodes the recognized signal into a binary coded form for transmission to an output circuit. The encoder is activated at the end of scanning a character by a pulse from an AND gate 212 which is activated by the coincidence of a clock pulse 37, an output signal from the "0" output terminal of the flip-flop 76, and an output signal from the "1" output terminal of the flip-flop 152. The decoder 200 is also coupled to an inverter 214 when none of the feature signal lines have been activated. The inverter applies a signal to the encoder which denotes that the character is unreadable. The encoder 210 encodes the recognition signal into a binary coded form for further processing.

A long vertical mark LVM circuit 190 is included in the recognition circuits 20 to detect a printed or handwritten mark which is much longer than a character. Such a mark may, for example, be utilized to mark off fields on a document. The LVM circuit 190 includes an input AND gate 192 which has as one input thereto a vertical stroke pulse from the AND gate 96 in the detector 90. The other input to the gate is a count of four (S4) in the counter 156. The output of the AND gate 192 is coupled to set a flip-flop 194 which is reset by a clear pulse. The "1" output terminal of the flip-flop 194 provides a long vertical mark LVM signal.

A long vertical mark signal occurs when a vertical stroke is detected while section four (S4) of a scanline is being scanned. Normally, vertical strokes in characters are only detected in sections S1 and S2 or sections S1 and S6 of a scanline. Thus, if a vertical stroke occurs in section S4 of a scanline, the stroke must be appreciably longer than a printed stroke and therefore must comprise a long vertical mark.

*Operation*

Figure 2A:
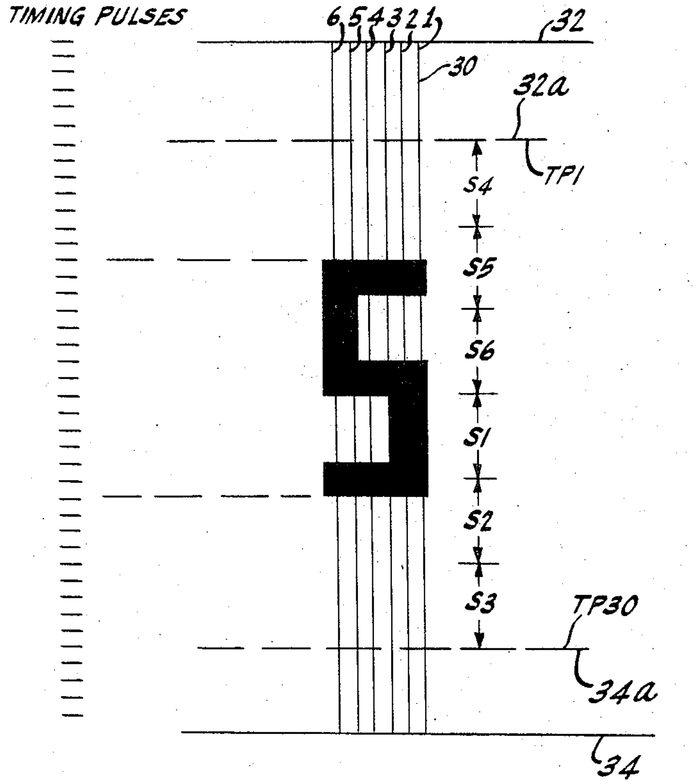
Figure 2C:
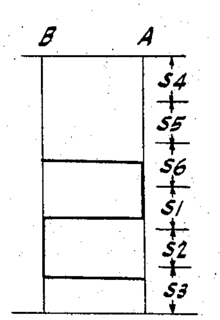
Figure 2B:
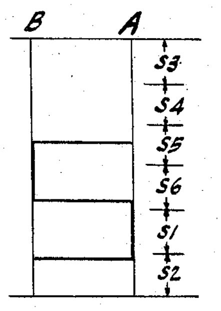
Figure 7:
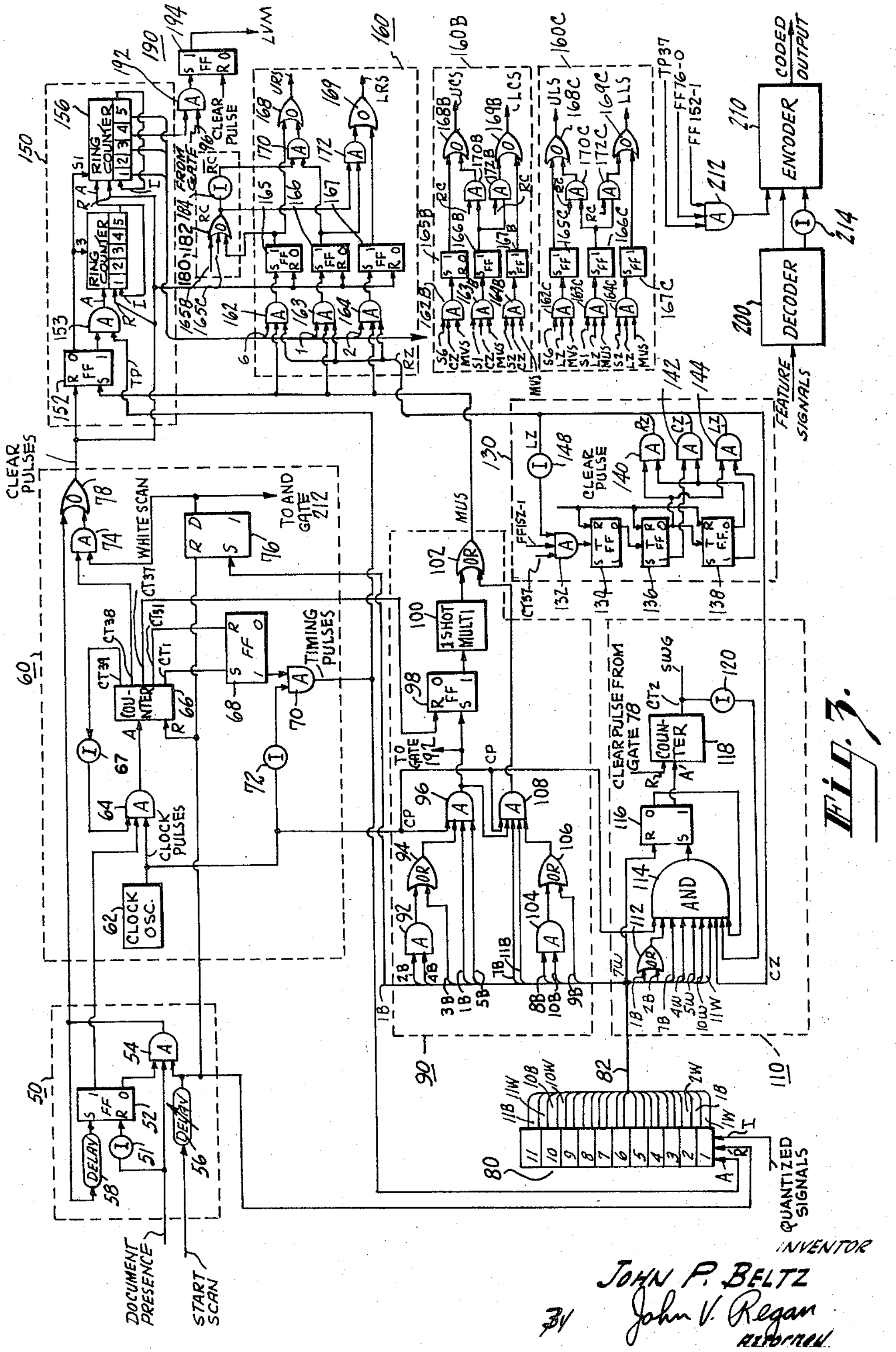

In describing the operation of the character recognition circuit 20 of FIGURE 3, it will be assumed that the numeral 5 shown in FIGURE 2*a* is being read. Before a document arrives in the scanning area, the absence of a document presence signal causes the inverter 53 to reset the flip-flop 52 in the input circuit 50. When the document 14 arrives in the scanning area, the transport mechanism 12 produces a document presence signal level which, in conjunction with the "0" output signal from the flip-flop 52, applies an enabling signal to the AND gate 54. The AND gate 54 is activated when a start scan pulse is derived from the delay circuit 56. The start scan pulse may, for example, be generated prior to the top line 32 in FIGURE 2*a* but the delay circuit 56 introduces a delay to cause the effective scanning raster to start at the line **32*a*** (FIGURE 2*a*). The delayed start scan pulse is applied to activate the AND gate 54 and the output of the gate 54 generates a clear pulse from the OR gate 78 (FIGURE 3). The pulse output of the AND gate 54 also sets the flip-flop 52 after a delay. The delay is introduced by the delay circuit 53 to permit the clear pulse to reset the various shift registers, flip-flops, etc., in the circuit to their initial state before the AND gate 54 is disabled. The delayed start scan pulse also resets the counter 66 in the synchronizer 60 to a count of zero which removes a disabling signal from the AND gate 64. Consequently, the counter 66 counts the clock pulse from the oscillator 62.

The count of one output from the counter 66 sets the flip-flop 68 to apply an enabling signal to the AND gate 70 in the synchronizer 60. The clock pulses CP from the clock oscillator 62 are inverted in the inverter 72 to activate the gate 70 and produce the timing pulses for the character recognition circuit 20. The clock and hence the timing pulses are counted in the counter 66 which advances by a count of one on the receipt of each clock pulse.

The timing pulses are applied as advance pulses to shift the video signals derived from the scanner 18 (FIGURE 1) into the initial shift register 80 in synchronism with the synchronizer 80. Thus, in FIGURE 2*a*, it is assumed that the beginning of the first timing pulse TP1 occurs at the line **32*a*. The effective scanning raster, therefore begins at the dotted line 32*a* at the first timing pulse TP1 and ends at the dotted line 34*a* at the end of the thirtieth timing pulse TP30. The character itself is assumed to be loacted between the timing pulses TP8 to TP21** since the character 5 is fourteen elements high which is equivalent to fourteen timing pulses. Thus, the character is appreciably over-scanned by the effective scanning raster to allow for any misalignment in the printing thereof.

In the first scanline 1, the outline trace of the character 5 is intercepted at the timing pulse TP8 and the first black element advanced into the register 80 sets the flip-flop 76 in the synchronizer 60 to denote that the scan is not a white scan. The first black element of the vertical stroke in the scanline 1 is advanced into the initial shift register 80 commencing at the time TP14. At the time TP18, the first five stages of the initial shift register 80 contain black elements therein and 1B through 5B signals are applied to the vertical stroke detector 90. The AND gate 96 in the vertical stroke detector 90 is therefore activated to set the flip-flop 98. The "1" output signal of the flip-flop 98 triggers the one-shot multivibrator 100 to produce a pulse therefrom. The pulse is coupled through the OR gate 102 to set the flip-flop 152 in the scanning sectionalizer 150. The setting of the flip-flop 152 activates the AND gate 153 to apply the timing pulses TP from the AND gate 70 to the ring counters 154 and 156. The pulse output from the OR gate 102 is also applied to the vertical zoning indicator 160. The AND gate 163 in the indicator 160 is activated by this pulse since the right zone RZ gate 140 is applying one enabling signal thereto and the ring counter 156 is applying the other enabling signal thereto. Thus, the flip-flop 166 is set.

Initially, the counter 154 is set to a count of three, whereas the counter 156 is initially set to a count of one. Thus, the stroke in scanline 1 of the character 5 is detected in the middle of section 1 of the scanline 1. The setting of the flip-flop 166 also activates the AND gate 170 since the $\overline{RC}$ signal is already enabling this gate. Thus, the OR gate 168 produces an upper-right stroke signal therefrom indicating that the first stroke detected in a character is classified as an upper-right stroke.

The timing pulses are now applied through the AND gate 153 to advance the scan section counters 154 and 156. The next three timing pulses after the stroke is detected advance the counter 154 from a count of three to a count of one as well as advance the ring counter 156 to a count of two. Therefore, the second section S2 of the scanline 1 begins at the timing pulse TP21 in FIGURE 2*a*. The second section S2 of the scanline ends at the timing pulse TP25 and the third section S3 ends at the bottom of the effective scanning raster at the line 34*a*. The thirty-first clock pulse counted in the counter 66 resets the flip-flop 68 and disables the AND gate 70 from producing a thirty-first timing pulse. No further video signals are advanced into the shift register 80 and consequently the bottom of the effective scanning raster is the line 34*a* in FIGURE 2*a*. Additionally, no further advance pulses are applied to the ring counter 154 so that the count in the counters 154 and 156 stops at a count of 5 and a count of 3, respectively.

The counter 66, however, continues to count the clock pulses produced by the clock oscillator 62. On the thirty-seventh pulse, which is effectively the end of the scan, the flip-flop 98 in the stroke detector 90 is reset so that a vertical stroke can be detected in the next scan. Additionally, the thirty-seventh pulse activates the AND gate 132 in the horizontal zoning indicator 130 to trigger the flip-flop 134 from the reset to the set state thereof. Thus, one scanline of the right zone has been counted.

The thirty-eighth pulse counted by the counter 66 is applied to the AND gate 202 but is blocked inasmuch as the flip-flop 76 has been set by a black element in this scan. The thirty-ninth pulse counted by the counter 66 is inverted in the inverter 68 and disables the AND gate 64. Thus, no further clock pulses from the clock generator 62 are applied to the counter 66 since the inverted output of the counter disables the AND gate 64.

At the start of the scanline 2, the delayed start scan pulse is applied to reset the counter 66 to a count of zero. The ring counters 154 and 156 commence counting from a count of 5 and 3, respectively, which is the end of the scanning section three (S3) of the scanlines. The scan section four (S4) ends at the timing pulse time TP5, the scan section five (S5) ends at the timing pulse TP10, whereas the scan section six (S6) ends at the timing pulse TP15. The scan section one (S1) repeats itself beginning at the timing pulse TP16. The gate 162 in the vertical zoning indicator 160 opens at the beginning of the scan section six (S6) but no vertical stroke is detected during this portion of the scanline. The right vertical stroke in the numeral 5 is detected again in scan section one (S1) in scanline 2. The remainder of the sequence of events in scanline 2 is similar to scanline 1. When the pulse 37 occurs at the end of the scanline 2, the flip-flop 134 in the horizontal zoning indicator 130 is reset, which in turn sets the next flip-flop 136. The setting of the flip-flop 136 deactivates the right zone AND gate 140 and the right vertical zone indicator 160. The center zone AND gate 142 as well as the center zone indicator 160A are activated. The center zone AND gate 142 applies an enabling signal to the AND gate 114 in the center white gap detector 110.

In the scanline 3, a horizontal stroke is detected. The first black element is advanced into the shift register 80 at the timing pulse TP8 when the top horizontal stroke is detected. At the time of the timing pulse TP14, black elements appear in the first, sixth and seventh stages of the register 80 and white elements appear in the other stages. Consequently, the AND gate 114 is activated and the flip-flop 116 is set. The setting of the flip-flop 116 advances the counter 118 to a count of one. At the timing pulse TP16, a white element in the seventh stage of the register 80 resets the flip-flop 116.

At the timing pulse TP20, the black elements from the middle horizontal stroke of the numeral 5 are in the sixth and seventh stages of the shift register 80, while a black element from the bottom horizontal stroke is in the first stage of the register 80. Therefore, the AND gate 114 is activated and the flip-flop 116 set. The counter 116 is advanced to a count of two and produces an output from the count of two terminal. The output signal is inverted to disable the AND gate 114. The output from the count of two terminal denotes that a white gap has been detected and effectively indicates the presence of a middle horizontal stroke. At the end of the scanline 3, the flip-flop 134 is again set. The scanline 4 produces no signal which is stored because the counter 118 remains at a count of two inhibiting the AND gate 114. The flip-flop 134 is reset at the end of scanline 4 which resets the flip-flop 136. The flip-flop 136 in turn sets the flip-flop 138. The left zone AND gate 144 is therefore activated and the AND gate 132 inhibited.

On scanline 5, black video signals start entering the shift register 80 at the time of the timing pulse TP8. At this time, the scanning sectionalizer 150 indicates that section S5 of a scan is being scanned. At the timing pulse TP11, the scanning section S6 begins and by the end of this timing pulse four black elements have entered the initial shift register 80. The fifth black element is entered on the next timing pulse TP12. The AND gate 96 in the vertical stroke detector 90 is clocked by the next clock pulse to produce a pulse output denoting a vertical stroke has been detected. The pulse activates the AND gate 162B since this gate was enabled by a scan section count of six (S6) and a left horizontal zone signal. The AND gate 162B produces an output which sets the flip-flop 165B. The OR gate 182 in the reclassification circuit 180 is activated by the flip-flop 165B to produce a reclassification signal RC. The reclassification signal is applied to activate the AND gate 172 in the left vertical zoning indicator 160 to denote that the first vertical stroke detected was acually a lower-right stroke (LRS). The reclassification signal RC is also inverted in the inverter 184 to disable the AND gate 170 in the vertical zoning indicator 160.

Thus, the detection of a vertical stroke in the scan section S6, subsequent to the detection of a vertical stroke in the scan section S1, denotes that the first vertical stroke detected in section one (S1) is a stroke from the lower zone of a character, whereas the succeeding stroke detected in section six (S6) is from the upper zone of a character.

The scanline 6 produces no additional feature signals that have not been detected before. The scanline 6 is the last scanline in which black video signals are detected. The next scanline is completely off the character 5 so that the flip-flop 76 is not set during this seventh scanline. At the end of scanline 7, the AND gate 212 is activated by the clock pulse 37. Previously, the outputs of the various circuits had been continuously applied to the feature decoder 200, which produced an output signal as the various feature signals, lower-right stroke, upper-left stroke, etc., were synthesized into a recognized character. The decoder 200 is effectively a physical exemplification of the Truth Table shown in FIGURE 4 and produces a separate output signal for each different character recognized. The recognized character signal is coupled through the AND gate 212 to be encoded in the encoder 210 from whence the encoded output signal is applied to an output circuit.

When the clock pulse 38 occurs in the seventh scan, the AND gate 74 in the synchronizer 60 is activated to produce a clear pulse which resets the character reader 20 for the receipt of the next character's feature signals.

Thus, a character reader which emphasizes the recognition of vertical strokes in a character is provided. The character reader is capable of recognizing distorted characters printed by high speed drum printers. The character reader utilizes the detection of one feature in a character, i.e., the first vertical stroke detected, to provide a vertical reference point from which the succeeding features are referenced. The succeeding features are referenced to the first stroke detected by dividing each scanline into a plurality of equal sections beginning with section 1, the section in which the detection of the first vertical stroke feature occurs. If a vertical stroke feature is detected in the scanning section 2 of a succeeding scanline, the first vertical stroke must in fact be an upper zone stroke and the second vertical stroke must be a lower zone stroke. On the other hand, if a vertical stroke feature is detected in the scanning section 6 of a succeeding scanline, the first vertical stroke must in fact be a lower zone stroke and the second vertical stroke must be an upper zone stroke.

What is claimed is:

1. In a character reader for reading characters from a document, said characters being formed of one or more distinctive features classifiable into a plurality of categories, the combination comprising, means for detecting a feature in a character, means for classifying said feature into a prescribed category, and means for reclassifying said feature into a different category when another predetermined feature is detected in said character.

2. In a character reader for reading characters from a document, said characters being formed of one or more distinctive features, the combination comprising, means for detecting a feature in a character and classifying said feature as occurring in a particular zone of said character, and means for reclassifying said feature as occurring in a different zone of said character when another predetermined feature is detected in said character.

3. In a character reader for reading characters from a document, said characters being formed of one or more dstinctive features occurring in the plurality of zones in said characters, said system including means for scanning each character to derive signals serially representing the features of said character, the combination comprising, means coupled to said scanning means for detecting a predetermined feature in a character, means for classifying said feature as occurring in a particular zone of said character, and means for reclassifying said feature as occurring in a different zone of said character based on the detection of another predetermined feature in said character.

4. In a character reader for reading characters from a document, said characters being formed of one or more distinctive features occurring in the plurality of zones of said characters, said system including means for scanning each character to derive signals serially representing the features of said character, the combination comprising, means for dividing each of said scanlines into a plurality of sections beginning when a predetermined feature is detected in a character, means for classifying said predetermined feature as occurring in one zone in said character, means for detecting other features in said character, and means for reclassifying said predetermined feature into a different zone when any of said other features are detected in a predetermined section of said scanlines.

5. In a character reader for reading characters from a document, said characters being formed of one or more distinctive features, the combination comprising, means for scanning said characters by a plurality of vertical scanlines to produce video signals serially representing the features of said characters, means for counting said scanlines to determine the horizontal location within a character from which the feature signals were produced, means for detecting a first stroke in a portion of one of said scanlines, means for dividing each scanline of said character that succeeds said one scanline into the same predetermined number of scan sections beginning at a first section corresponding to said portion of said one scanline wherein said first stroke is detected, means for detecting a second stoke in said succeeding scanlines of said character, and means for comparing the scan section in which said second stroke is detected with said first scan section to determine the vertical location within a character from which said second stroke in produced.

6. In a character reader for reading characters from a document, said characters being formed of one or more distinctive features including vertical stroke features, said system including means for scanning each character by a plurality of vertical scanlines to derive signals serially representing the features of said character, the combination comprising, means for dividing each of said scanlines into a plurality of sections beginning at a first section when a vertical stroke is first detected in a character, means for storing said first vertical stroke feature signal in a storage location denoting that the first vertical stroke feature occurred in a particular one of the zones of the character, means for storing remaining vertical stroke feature signals in other storage locations denoting the section of a scanline in which they were detected, and means for classifying said first feature signal as occurring in one zone when a vertical stroke feature signal is detected in a section immediately succeeding the first section and as occurring in another zone when the vertical stroke feature signal is detected in a section immediately preceding the first section.

7. In a character reader for reading characters from a document, said characters being formed of one or more distinctive features including vertical strokes occurring in a plurality of zones of said characters, said system including means for scanning each character by a plurality of scanlines to derive signals serially representing the features of said character, the combination comprising, means for detecting a predetermined feature in a portion of one scanline of a character, means for dividing each scanline of said character that succeeds said one scanline into the same predetermined number of sections beginning at a first section corresponding to said portion of said one scanline wherein said predetermined feature is detected, and means for determining the relative positions within said character of the features detected in said succeeding scanlines by comparing the scan sections in which they are detected to said first scan section.

8. In a character reader for reading characters from a document, said characters being formed of one or more distinctive features including vertical strokes occurring in a plurality of zones of said characters, said system including means for scanning each character by a plurality of scanlines to derive signals serially representing the features of said character, the combination comprising, means for detecting the vertical strokes in a character, means for dividing said scanlines into a plurality of sections beginning at a first section when the first vertical stroke is detected in a character, means for classifying said first vertical stroke as occurring in one zone in said character, means for storing the scanning sections in which vertical strokes are detected in succeeding scanlines to determine the relative locations of all the vertical strokes within said character, and means for reclassifying said first vertical stroke as occurring in a different zone when any of the other vertical strokes are detected in a predetermined section of said scanlines.

(References on following page)

References Cited by the Examiner

UNITED STATES PATENTS

| | | | |
|---|---|---|---|
| 2,889,535 | 6/1959 | Rochester et al. ---- | 340—146.3 |
| 3,142,818 | 7/1964 | Holt -------------- | 340—146.3 |
| 3,177,469 | 4/1965 | Chow ------------ | 340—146.3 |
| 3,178,687 | 4/1965 | Perotto ----------- | 340—146.3 |
| 3,178,688 | 4/1965 | Hill et al. ---------- | 340—146.3 |
| 3,223,972 | 12/1965 | Ulzurrun ---------- | 340—146.3 |
| 3,223,973 | 12/1965 | Chatten ----------- | 340—146.3 |
| 3,231,860 | 1/1966 | Chatten ---------- | 340—146.3 |

MAYNARD R. WILBUR, *Primary Examiner.*

MALCOLM A. MORRISON, *Examiner.*

J. E. SMITH, *Assistant Examiner.*